Patented May 11, 1948

2,441,515

UNITED STATES PATENT OFFICE 2,441,515

INTERPOLYMERS OF A STYRENE, AN ALLYLIC ACRYLATE, AND AN ALLYLIC ALCOHOL

Robert H. Snyder, Newark, N. J., assignor to United States Rubber Company, New York, N. Y., a corporation of New Jersey No Drawing. Application July 12, 1944,
Serial No. 544,626

7 Claims. (Cl. 260—84)

This invention relates to new compositions of matter which are denoted interpolymers of styrene, an allylic acrylate, and an allylic alcohol.

According to my invention these products constitute a new class of low molecular weight, unsaturated polymeric materials which are soluble in a variety of organic solvents and which can be converted into insoluble, infusible products either by heat and/or catalysts or by interpolymerization with other organic materials capable of addition polymerization. These new polymers are obtained by interpolymerizing styrene, an allylic acrylate, and an allylic alcohol.

It is known to copolymerize styrene and allylic acrylates. When this polymerization is carried out at temperatures below 180° C. insoluble, infusible products are formed, to the exclusion of any substantial quantity of soluble polymers, unless the concentration of polymerizable monomer in the reaction mixture is kept below 40% by weight. Soluble products can be formed at temperatures above 180° C. but the use of such elevated temperatures to carry out a polymerization is undesirable since it necessitates the use of a closed system to avoid excessive loss of the monomeric starting materials.

The styrene-allylic acrylate resins can be obtained in soluble form, according to the prior art, by halting the polymerization before gelation occurs, or by carrying out the interpolymerizations in dilute solutions, but the low and inefficient conversion of monomers to polymer renders the large-scale preparation of the products by this method economically dubious.

It is also known to the art that soluble interpolymers of styrene and allylic acrylate can be obtained by carrying out the polymerization at temperatures above 180° C., insoluble products being formed at temperatures below this point (U. S. Patent No. 2,290,164). However at such elevated temperatures there is an excessive loss of monomeric starting materials from the reaction mixture by volatilization, thus necessitating the use of super-atmospheric pressures to constrain the reactants. Moreover, some insoluble polymer is often formed during the time required to bring the initial reaction mixture up to 180° C., and the amount of insoluble polymer formed tends to vary directly with the time required to attain reaction temperatures; hence, the difficulties in securing a reproducibly uniform product are materially enlarged.

I have found that by interpolymerizing styrene and an allylic acrylate in the presence of a sufficient quantity of an allylic alcohol certain desirable and unexpected results are obtained, viz.:

(1) The polymerization can be carried out by the use of conventional peroxide catalysts at temperatures below 180° C. and to give high yields of soluble and fusible polymer. It is not necessary to use solutions containing less than 40% by weight of polymerizable monomers to avoid the formation of insoluble infusible polymer at these lower temperatures; in fact the interpolymers of my invention are readily prepared in the absence of any solvent other than the reactive monomers themselves.

(2) The products formed are of lower molecular weight than those obtained by carrying out the polymerization in the absence of the allylic alcohol. As a result, solutions of my products in organic solvents have low viscosities.

(3) My new polymers are true ternary interpolymers of styrene, an allylic acrylate and an allylic alcohol. They contain, attached to the polymer chain, hydroxymethyl groups derived from the allylic alcohol which has interpolymerized with the other two monomeric materials. The presence of these hydroxymethyl groups in the polymer renders it capable of being modified by reaction with reagents known to react with alcoholic hydroxyl groups. By such reactions my new polymers may be converted into other modified polymers having desirable properties.

(4) The styrene and allylic acrylate or α-substituted acrylate will interpolymerize with an allylic alcohol at moderate temperatures to give high yields of ternary interpolymers which are not only completely soluble in a variety of organic solvents, but still contain sufficient residual unsaturation to enable them to be further polymerized with or without the addition of a copolymerizable compound containing an ethylenic linkage, to form insoluble, infusible resins.

In carrying out my invention the styrene, the allylic acrylate, the desired quantity of allylic alcohol, and a peroxide catalyst, such as acetyl peroxide, benzoyl peroxide, tertiary-butyl hydrogen peroxide, are mixed and the polymerization carried out in the oil phase. The temperatures employed usually are in the range of from 25° C. to 120° C. although higher temperatures may be employed if desired. I generally prefer, however, to carry out the polymerizations at temperatures below 120° C.

The allylic acrylates which I have found to be operable in my invention have the formula

wherein each R can be hydrogen or alkyl, e. g., methyl or ethyl, or halogen, e. g., chlorine. Exemplary of such compounds are allyl acrylate, allyl methacrylate, methallyl acrylate, methallyl methacrylate, allyl alpha-chloroacrylate, and 2-chloroallyl methacrylate.

In place of styrene, nuclearly substituted styrenes, and particularly para-substituted styrenes such as para-methyl-styrene, and para-chlorostyrene, can be employed. I have found, however, that styrenes in which the alpha hydrogen atom in the vinyl radical is replaced by another group, as in α-methyl-para-methylstyrene, show little tendency to polymerize under the conditions of my reaction and therefore are not included within the scope of the invention.

The allylic alcohols which can be used in the preparation of my new interpolymers are those which contain the structure

Examples of such alcohols are allyl alcohol, 2-chloroallyl alcohol, 2-methylallyl alcohol (usually referred to as methallyl alcohol), and 2-ethylallyl alcohol.

The relative proportions of the styrene and allylic acrylate in the interpolymer may be varied over a considerable range depending on the physical properties desired. The amount of the allylic alcohol used also may be varied considerably and will depend upon the molecular weight desired in the final interpolymer, and upon the amount of hydroxymethyl groups which it is desired to have present in the polymeric product. As little as 10% of an allylic alcohol based on the total weight of the other reactive monomers is sufficient to prevent the formation of insoluble, infusible products during the early stages of the polymerization, but to insure the production of a soluble, fusible, low molecular weight product, amounts in excess of 50% of the allylic alcohol should be used. With larger amounts of allylic alcohol present, the major proportion of monomeric styrene and allylic acrylate can be converted to soluble polymer and with 75% or more of allylic alcohol in the reaction mixture no gelation occurs.

In carrying out the polymerization, the mixture of the styrene, allylic acrylate and allylic alcohol, together with the catalyst, is heated until the polymerization has been carried to the desired extent. The extent of polymerization may be determined either by measuring the increase in the viscosity of the reaction mixture or by taking out samples from time to time and determining the amount of polymer formed. The finished interpolymer may be recovered from the reaction mixture by extraction of the unreacted starting materials with a solvent therefor which is a nonsolvent for the polymer. Gasoline is a suitable solvent of this type. The polymer may be purified by dissolving it in a solvent for the polymer such as acetone and then adding enough of a nonsolvent such as gasoline to precipitate the pure polymer.

The polymer may be dried and can be cast or molded in a known manner to form rods, blocks, or sheets. It can also be dissolved in an appropriate solvent and employed as a lacquer or impregnating and water-proofing composition for textiles, leather, wood, etc. Application of heat to any of such compositions, particularly in the presence of catalysts, induces further polymerization, and the resulting cross-linked products are quite indifferent to elevated temperatures and are strongly resistant to attack by solvents.

Because of the fact that my new unsaturated polymers are soluble in a variety of organic solvents, and particularly in organic liquids which are themselves capable of addition polymerization such as methyl acrylate, diallyl fumarate, vinyl acetate, etc., they may be used in a variety of ways. The polymers of my new invention may be dissolved in such reactive solvents to form coating compositions which can then be polymerized to an insoluble, infusible polymer without the necessity for the evaporation of a solvent. Such solutions may also be used as liquid casting compositions which are capable of being converted by the action of heat and suitable catalysts to solid materials. The low molecular weight of my new polymers enables them to form solutions of low viscosity in organic solvents and makes them particularly useful in the production of protective coatings.

Products of even lower molecular weight can be obtained by carrying out the interpolymerizations in the presence of regulator solvents such as carbon tetrachloride which serve to decrease the length of the polymer chains. Products prepared by such methods are particularly desirable for securing coating compositions of low viscosity and high solids content.

The results of elementary analyses and of other specific tests on my interpolymers prove the presence of unsaturation and of free hydroxyl groups derived from the introduction, respectively, of allylic acrylate and of allylic alcohol units into the polymer chain. The unsaturated interpolymers of my invention, being capable of conversion to insoluble infusible products, are particularly useful, either in the solid state or in solution, for coating, molding, casting, laminating and impregnating operations where articles capable of being preformed and then "set" or cured in the final shape are desired. Solutions of my interpolymers in copolymerizable monomers are quite fluid even when they contain relatively large amounts of the reactive polymer dissolved in the monomer, and their low viscosities render them particularly suitable for application as coating compositions by brushing, spraying or dipping. Suitable dyes, pigments, fillers and plasticizers can be conveniently incorporated with my interpolymers at their soluble thermoplastic stage prior to final cure.

My interpolymers are capable of further modification by treatment with reagents capable of reacting with the free hydroxyl groups attached to the interpolymerized allylic units of the polymer chain, e. g., with alkyl and acyl halides, acids and their anhydrides, isocyanates, and the corresponding dihalides, etc. The resulting ethers, esters and carbamates, etc., of my interpolymers can then be utilized in any of the commercial applications mentioned above.

The following examples are given to illustrate my invention in more detail; all parts are by weight:

EXAMPLE 1

A mixture of 78 parts of styrene, 142.0 parts of allyl acrylate, 660 parts of methallyl alcohol and 9.0 parts of benzoyl peroxide was heated at 90° C. for 15.5 hours. Two tenths of a part of hydroquinone were then added to avert further polymerization and most of the unreacted methallyl alcohol was removed from the reaction mixture by distillation under reduced pressure. The viscous residue was purified by repeatedly dissolving it in acetone and precipitating it with gasoline, and after drying in vacuo, 215 parts of a colorless solid were obtained as the final product.

*Analysis.*—Found: C, 73.4, 73.27%; H, 8.24, 8.14%. Iodine (Wijs) number=94.6, 94.8.

A solution containing 30 parts of the interpolymer dissolved in 70 parts of acetone has a viscosity of 0.144 poise at 25° C. while a solution containing 30 parts of the interpolymer dissolved in 70 parts of methyl acrylate has a viscosity of 0.55 poise at 25° C.

The interpolymer appears to contain a plurality of each of the following units as integral components of the polymeric chain:

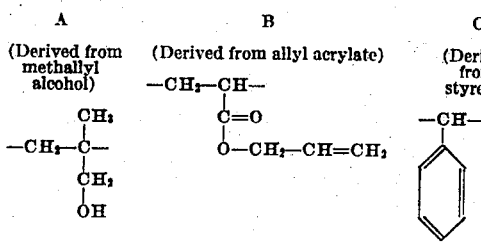

together with a minor number of units having the structure:

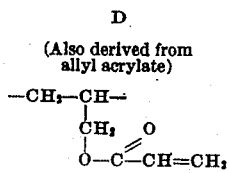

as well as the lactone unit:

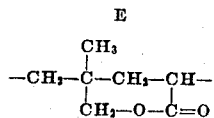

and the unit:

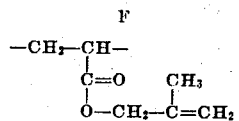

from methallyl acrylate resulting from alcoholysis, as shown below.

The above analysis corresponds to a ternary interpolymer derived from approximately 30.8% by weight of styrene, approximately 52.2% of allyl acrylate and approximately 17.0% of methallyl alcohol (neglecting slight variations caused by some alcoholysis and lactone formation), representing a conversion of approximately 84.6% of the monomeric styrene and 79.0% of the monomeric allyl acrylate to the interpolymeric form.

It is believed that the interpolymer undergoes two secondary reactions with the elimination of allyl alcohol (allyl alcohol actually is found in the distillate when the reaction mixture is subjected to fractional distillation to remove the unreacted methallyl alcohol as described above). These are:

1. Lactonization, in which adjacent units of the polymer chain, derived respectively from methallyl alcohol and from allyl acrylate, react to form a cyclic inner ester with the elimination of a molecule of allyl alcohol thus:

Interpolymeric esteralcohol unit

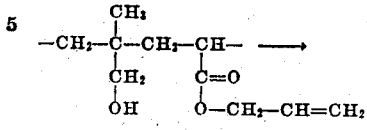

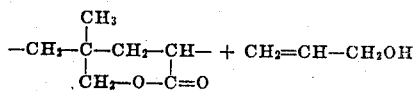

This reaction is favored by elevated temperatures.

2. Alcoholysis, in which the true allyl groups of the allyl acrylate units undergo an alcohol interchange with the unreacted methallyl alcohol in the reaction mixture, thus:

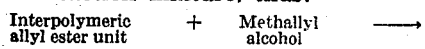

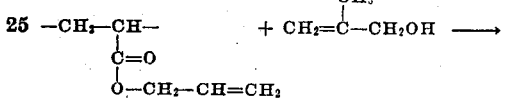

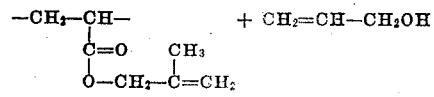

This reaction is favored by an excess of methallyl alcohol in the reaction mixture.

EXAMPLE 2

The large amount of unsaturation in my interpolymer as indicated by the high iodine number enables the material to be further polymerized or copolymerized with great ease and speed. This is illustrated in the following examples:

(a) Three and one-half parts of the interpolymer of Example 1 were dissolved in a mixture of 0.7 part of cyclohexanone and 10 parts of acetone. The resulting solution was poured in a thin film on a glass panel and baked at 200° C. for 20 minutes. The resulting film was clear, tough, water-white, completely insoluble in boiling acetone and cyclohexanone, and hard and tack-free even at 200° C.

(b) A mixture of 2.5 parts of the interpolymer of Example 1 and 2.5 parts of diallyl adipate was dissolved in 7 parts of acetone containing 0.1 part of cyclohexanone. The resulting solution was poured as a film on a glass panel and after baking at 200° C. for 20 minutes, a clear, flexible, tough insoluble film was formed.

(c) When diallyl phthalate was substituted for the diallyl adipate in (b) above, a clear, tough, insoluble and somewhat harder film was obtained.

(d) A solution of 15 parts of the interpolymer of Example 1 in 7.5 parts of methyl acrylate was heated together with 0.2 parts of benzoyl peroxide for 16 hours at 60° C. and then for 8 hours at 100° C. A clear, tough casting of Rockwell hardness M55 was obtained which was insoluble in acetone.

(e) When methyl methacrylate was substituted for the methyl acrylate in (d) above, a clear, insoluble casting was obtained but having Rockwell hardness of M95.

(f) Tough, flexible films were obtained in each case when n-butyl acrylate, isobutyl acrylate and tetrahydro-furfuryl acrylate were copolymerized with the unsaturated interpolymer as in the above examples.

EXAMPLE 3

(a) A mixture of 26.0 parts of styrene, 28.0 parts of allyl acrylate and 7.2 parts of methallyl alcohol was dissolved in 61.2 parts of carbon tetrachloride (which serves both as a solvent and as a polymerization regulator) together with 1.11 parts of benzoyl peroxide as catalyst, and the resulting solution was heated for 17 hours at 90° C. The reaction mixture was cooled and 0.05 part of tertiary-butyl catechol was added to avert further polymerization, and the carbon tetrachloride and unreacted methallyl alcohol were then removed from the syrupy reaction product by distillation under diminished pressure. The viscous residue was poured into gasoline, precipitating the polymer as a white plastic solid. This was further purified by redissolving it in acetone and precipitating it with gasoline. After the product was dried in vacuo, 28.8 parts of a clear solid were obtained.

*Analysis.*—Found: C, 77.93, 77.93%; H, 7.77, 7.47%. Iodine (Wijs) number=99.1, 100.0.

The above analyses correspond to a ternary interpolymer prepared from approximately 48.0% by weight of styrene, 46.8% of allyl acrylate and 5.2% of methallyl alcohol (molar ratio of 6.4:5.8:1.0). This represents a conversion of approximately 48.0% of monomeric allyl acrylate and 53.1% of monomeric styrene to the polymeric form. The iodine number indicates the amount of unsaturation in the polymer which is available for further polymerization. When the above example is repeated in the absence of methallyl alcohol, a considerably lower yield of soluble polymer is obtained prior to gelation.

(b) Ten parts of the ternary interpolymer were dissolved in 5.0 parts of methyl acrylate together with 0.1 part of benzoyl peroxide and the resulting solution was heated at 60° C. for 18 hours. A hard transparent casting was obtained which is insoluble in acetone and benzene and retains its toughness as well as its original shape and dimensions even when heated to 100° C.

(c) Similarly a clear hard casting was prepared by heating a solution of 4 parts of the interpolymer in 2 parts of methyl methacrylate together with 0.05 part of benzoyl peroxide for 17 hours at 60° C. and for an additional 0.75 hour at 130° C. The product has a Rockwell hardness of M84, is insoluble in organic solvents, and remains firm and hard even when heated to 130° C.

EXAMPLE 4

To demonstrate the efficacy of interpolymerizing an allylic alcohol with styrene and an allylic acrylate in increasing the yield of soluble interpolymer, a number of interpolymerizations were carried out in which mixtures containing varying proportions of styrene, the allylic acrylate and the allylic alcohol were heated at 60° C. with benzoyl peroxide until the mixtures had polymerized to the point of incipient gelation. At this stage the polymerizations were halted by cooling the reaction to room temperature and the products were isolated by pouring the reaction mixtures into gasoline. The precipitated interpolymers were then purified by thorough washing with several portions of gasoline and drying in vacuo to constant weight.

The amount of interpolymer formed up to the moment of gelation furnishes a convenient measure of the effect which the allylic alcohol has in increasing the yield of the soluble type interpolymer.

The data pertinent to these reactions are tabulated in the table. For purposes of comparison only, data on a styrene-allyl acrylate copolymer and a styrene-allyl methacrylate copolymer—(a) and (b)—are also included in the table, but these are not to be regarded as coming within the scope of my invention.

Table

| Run | Styrene, Parts | Allyl Acrylate, Parts | Allyl Methacrylate, Parts | Allyl Alcohol, Weight Per Cent | Methallyl Alcohol, Weight Per Cent | Peroxide, Parts | Reaction Time, Hours | Yield, Parts | Character of Reaction Product |
|---|---|---|---|---|---|---|---|---|---|
| a | 63.3 | 36.7 | | | | 0.024 | 7.5 | 4.62 | complete gelation. |
| b | 45.3 | | 54.7 | | | 0.208 | 3.5 | 10.2 | Do. |
| c | 63.3 | 36.7 | | | 20.0 | 0.024 | 15.75 | 10.9 | incipient gelation. |
| d | 63.3 | 36.7 | | | 80.0 | 7.5 | 96.0 | 102.5 | no evidence of gelation. |
| e | 63.3 | 36.7 | | | 66.5 | 5.61 | 50.0 | 102.0 | Do. |
| f | 48.1 | 51.9 | | | 50.0 | 1.85 | 7.0 | 37.0 | incipient gelation. |
| g | 48.1 | 51.9 | | | 75.0 | 2.78 | 30.5 | 97.0 | no evidence of gelation. |
| h | 28.5 | 71.5 | | | 66.5 | 5.48 | 4.2 | 59.8 | incipient gelation. |
| i | 28.5 | 71.5 | | | 75.0 | 5.48 | 22.0 | 116.0 | Do. |
| j | 68.5 | 31.5 | | | 67.0 | 2.82 | 28.0 | 93.7 | no evidence of gelation. |
| k | 63.3 | 36.7 | | | 50.0 | 2.81 | 11.25 | 52.0 | incipient gelation. |
| l | 63.3 | 36.7 | | 50.0 | | 1.87 | 16.75 | 53.0 | Do. |
| m | 60.4 | | 39.6 | 50.0 | | 1.79 | 20.75 | 59.3 | Do. |

Comparison of Reactions a, c, h, and k in the above table indicates that even with relatively large amounts of catalyst present, the allylic alcohol present is clearly effective in increasing the amount of conversion of the monomeric mixture to the polymeric state before insolubilization occurs. Moreover, Reactions d, e, and j show that, with sufficient allylic alcohol available in the reaction mixture for interpolymerization with styrene and the allylic acrylate, no insoluble gel is formed despite the much longer reaction times employed in these three reactions, and the major portion of the monomeric styrene and allylic acrylate or α-substituted acrylate in the reaction mixture is converted into the soluble polymeric form.

EXAMPLE 5

(a) A mixture of 33.8 parts of styrene, 19.6 parts of allyl acrylate, 213.6 parts of methallyl alcohol and 3.0 parts of benzoyl peroxide was heated for 51 hours at 85–90° C. The unreacted methallyl alcohol was then removed by distillation under diminished pressure and the viscous residue was purified by repeatedly dissolving in acetone and precipitating with gasoline. After drying in vacuo, 62.4 parts of a white solid were obtained.

*Analysis.*—Found: C, 79.60, 79.54%; H, 8.36, 8.38%. Iodine (Wijs) number 52.2, 50.4.

The above analyses correspond to a ternary interpolymer derived from approximately 53.7% by weight of styrene, 23.3% of allyl acrylate and 24.0% of methallyl alcohol (molar ratio of 2.43:1.00:1.60). This represents a conversion of approximately 98% of the monomeric styrene and 74% of the monomeric allyl acrylate to the polymeric form.

(b) Thirteen parts of the interpolymer of Example 5 were mixed with 0.65 part of benzoyl peroxide and molded at 130° C. and 10,000 p. s. i. for 15 minutes. A hard, clear, insoluble product resulted.

(c) A solution of 5.0 parts of the interpolymer of Example 5 in 2.5 parts of methyl acrylate was heated together with 0.05 part of benzoyl peroxide for 15 hours at 60° C. The clear, hard, tough casting which resulted was insoluble in organic solvents and retained its shape and toughness even when heated at 110° C.

(d) When vinyl acetate was substituted for the methyl acrylate in (c) above, a tough, flexible insoluble casting was secured.

(e) A solution of 10 parts of the interpolymer of Example 4 in a mixture of 0.5 part of allyl acrylate and 3.6 parts of methyl acrylate was heated together with 0.2 part of benzoyl peroxide at 60° C. for 15 hours and then at 130° C. for 4 additional hours. The resultant casting is clear, tough and insoluble, and possesses a Rockwell hardness of M45.

EXAMPLE 6

This example affords direct proof of the existence of free hydroxyl groups in the ternary interpolymers of my invention.

Three parts of carefully dried interpolymer prepared as in Example 5 (a) above were dissolved in 9.8 parts of anhydrous pyridine together with 2.0 parts of phenyl isocyanate and the resulting solution was heated at 60° C. for 19 hours in an inert nitrogen atmosphere. The product was recovered by pouring the reaction mixture into gasoline and the precipitated polymer thus obtained was purified by repeatedly dissolving it in anhydrous C. P. acetone and precipitating it with anhydrous ether. After drying in vacuo a beige-colored solid was obtained.

*Analysis.*—Found: N, 1.41, 1.40%.

The presence of nitrogen in the product indicates that phenyl isocyanate has been incorporated in the polymer by reaction with the hydroxyl groups of the interpolymerized methallyl alcohol units of the polymer chain. From the magnitude of the nitrogen content of the polymer it is concluded that the polymer chain contains at least one interpolymerized methallyl alcohol unit for every eight units of allyl acrylate and styrene.

EXAMPLE 7

(a) A mixture of 33.8 parts of styrene, 19.6 parts of allyl acrylate, 53.0 parts of methallyl alcohol and 1.0 part of benzoyl peroxide was heated for 1.5 hours at 90° C. One tenth part of tertiary-butyl catechol was then added to avert further polymerization and the polymeric product was recovered by pouring the reaction mixture into gasoline. After purifying the precipitated polymer as in previous examples, 30 parts of a white, acetone-soluble solid were obtained.

*Analysis.*—Found: C, 80.89, 80.95%; H, 7.83, 7.88%. Iodine (Wijs) number 73.0, 73.3.

The analytical data correspond to a ternary interpolymer derived from approximately 58.8% by weight of styrene, 32.7% of allyl acrylate and 8.5% of methallyl alcohol (molar ratio of 4.8:2.5:1.0). This corresponds to a conversion of approximately 51.7% of the monomeric styrene and 50.0% of the monomeric allyl acrylate to the polymeric form.

A solution of 5.0 parts of the interpolymer of Example 6 in 2.5 parts of methyl acrylate was heated with 0.05 part of benzoyl peroxide for 22 hours at 60° C. and then for 5 additional hours at 110° C. A hard, tough insoluble casting was obtained.

EXAMPLE 8

Two and one-half parts of the ternary interpolymer prepared in Example 7 above were dissolved together with 2.5 parts of diallyl phthalate in a mixture of 7.5 parts of acetone and 0.1 part of cyclohexanone, and the resulting solution was poured onto a glass plate and baked at 200° C. for 70 minutes. A clear, hard, tough, colorless film was thus obtained which was tack-free even at 200° C., and was insoluble in acetone and cyclohexanone.

EXAMPLE 9

(a) A mixture of 33.8 parts of styrene, 22.1 parts of allyl methacrylate, 55.9 parts of allyl alcohol and 1.0 part of benzoyl peroxide was heated at 90° C. for 3.5 hours. After isolation and purification as in previous examples, 41.5 parts of polymeric product were obtained.

*Analysis.*—Found: C, 79.99, 80.20%; H, 8.21, 8.23%. Iodine (Wijs) number 71.4, 73.8.

The above analyses correspond to a ternary interpolymer derived from approximately 55.0% by weight of styrene, 28.0% of allyl methacrylate and 17.0% of allyl alcohol (molar ratio of 2.38: 1.00:1.32), representing a conversion of approximately 67.5% of monomeric styrene and 52.5% of monomeric allyl methacrylate to the polymeric form.

(b) A solution of 5 parts of the interpolymer of Example 9 in 3.33 parts of methyl methacrylate was heated together with 0.05 part of benzoyl peroxide for 21 hours at 60° C. and then at 110° C. for an additional 5 hours. The product was a clear insoluble casting having a Rockwell hardness of M85.

(c) Similarly, 5 parts of the interpolymer were dissolved in 2.5 parts of vinyl butyrate together with 0.05 part of benzoyl peroxide, and the resulting solution was heated for 18 hours at 60° C. and then for 5 hours at 110° C. By this method a clear, tough casting was obtained which was insoluble in organic solvents such as acetone and benzene.

EXAMPLE 10

This example demonstrates the usefulness of the invention in preparing a baking enamel.

A solution was made containing 500 parts by weight of styrene-allyl acrylate-methallyl alcohol terpolymer (Example 1), 100 parts by weight of n-butanol, and 400 parts by weight of commercial xylenes.

To this solution was added approximately 250 parts by weight of rutile titanium dioxide pigment, and the resulting paste finely ground by milling on a standard three-roll ink mill. The enamel base so obtained was reduced to a spraying viscosity with additional butanol-xylene mixed solvent, containing butyl carbitol acetate (i. e., butoxy ethoxyethyl acetate) in a proportion of about 8% based on the weight of the resin.

The enamel was sprayed on steel panels and baked for 20 minutes at 400° F. The films were cured as evidenced by their insolubility, and were not tacky when hot. Further, they were characterized by good gloss and adhesion, and excellent hardness. Moreover, they possessed an excellent white color; even after baking for one hour at 400° F.; the yellowing was negligible. The flexibility of the films is fairly good. This property can be improved by adding a compound, such as diallyl adipate to the enamel prior to spraying. Thus when I add 15% (by weight based on the weight of the terpolymer) of diallyl adipate, and then proceed as above, the resulting enamel films cure in 20 minutes at 400° F., and possess the other excellent properties noted. In addition, the films are now more elastic. Thus the panels can be flexed through 90° angles and only negligible cracking of the films occurs.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. An interpolymerizate of styrene, an allylic acrylate of the formula

where each R is one of the radicals hydrogen, methyl, ethyl, and chlorine, and an allylic alcohol of the formula

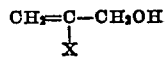

where X is one of the radicals hydrogen, methyl, ethyl, and chlorine, which is characterized as being soluble in acetone, said interpolymerizate having intact unsaturated allylic radicals, the proportion by weight of the allylic alcohol based on the total weight of the other reactive monomers being at least 10%.

2. A method which comprises heating together in the presence of a peroxide catalyst an allylic acrylate of the formula

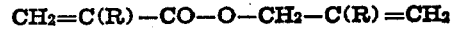

where each R is one of the radicals hydrogen, methyl, ethyl, and chlorine, a styrene selected from the class consisting of styrene, nuclear-methyl-substituted styrenes and nuclear-chlorine-substituted styrenes, in which the vinyl group is intact, and an allylic alcohol of the formula

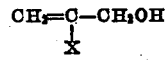

where X is one of the radicals hydrogen, methyl, ethyl, and chlorine, until the mixture is interpolymerized to a point short of gelation, whereby to form an interpolymer having intact unsaturated allylic radicals and characterized as being soluble in acetone, the ratio of the allylic alcohol to the total weight of the other unsaturated monomers in the initial reaction mixture being at least 10%.

3. A method which comprises heating together in the presence of a peroxide catalyst an allylic acrylate of the formula

where each R is one of the radicals hydrogen, methyl, ethyl, and chlorine, styrene, and an allylic alcohol of the formula

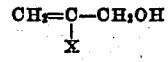

where X is one of the radicals hydrogen, methyl, ethyl, and chlorine, until the mixture is interpolymerized to a point short of gelation, whereby to form an interpolymer having intact unsaturated allylic radicals and characterized as being soluble in acetone, the ratio of the allylic alcohol to the total weight of the other unsaturated monomers in the initial reaction mixture being at least 10%.

4. An interpolymerizate of a styrene selected from the class consisting of styrene, nuclear-methyl-substituted styrenes and nuclear-chlorine-substituted styrenes, in which the vinyl group is intact, a compound of the formula $CH_2=C(R)-CO-O-CH_2-C(R)=CH_2$ where R is a radical selected from the class consisting of hydrogen, methyl, ethyl, and chlorine, and an allylic alcohol comprising the group

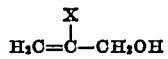

where X is one of the radicals hydrogen, methyl, ethyl, and chlorine, said interpolymerizate having intact unsaturated allylic radicals, the proportion by weight of the allylic alcohol based on the total weight of the other reactive monomers being at least 10%.

5. A ternary interpolymerizate of styrene, allyl acrylate and methallyl alcohol, the interpolymerizate having intact unsaturated allylic radicals, the proportion by weight of the methallyl alcohol based on the total weight of the other reactive monomers being at least 10%.

6. A ternary interpolymerizate of styrene, allyl acrylate and allyl alcohol, the interpolymerizate having intact unsaturated allylic radicals, the proportion by weight of the allyl alcohol based on the total weight of the other reactive monomers being at least 10%.

7. An enamel containing an interpolymerizate as set forth in claim 4, and including also a pigment and a resin solvent.

ROBERT H. SNYDER.

REFERENCES CITED

The following references are of record in the file of this patent:

UNITED STATES PATENTS

| Number | Name | Date |
|---|---|---|
| 2,332,460 | Muskat | Oct. 19, 1943 |
| 2,378,195 | D'Alelio | June 12, 1945 |